United States Patent
Targhi et al.

(10) Patent No.: US 11,214,180 B1
(45) Date of Patent: Jan. 4, 2022

(54) VEHICLE SEAT WITH RECLINING MECHANISM

(71) Applicants: Ali Tavakoli Targhi, Sunnyvale, CA (US); Lukas Satas, San Jose, CA (US); Per G. Isaksson, Mountain View, CA (US); Donald R. Monroe, Los Gatos, CA (US)

(72) Inventors: Ali Tavakoli Targhi, Sunnyvale, CA (US); Lukas Satas, San Jose, CA (US); Per G. Isaksson, Mountain View, CA (US); Donald R. Monroe, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/914,711

(22) Filed: Jun. 29, 2020

Related U.S. Application Data

(60) Provisional application No. 62/904,261, filed on Sep. 23, 2019.

(51) Int. Cl.
*B60N 2/22* (2006.01)
*B60N 2/02* (2006.01)

(52) U.S. Cl.
CPC ......... *B60N 2/2236* (2013.01); *B60N 2/0244* (2013.01); *B60N 2002/0272* (2013.01)

(58) Field of Classification Search
CPC .... A61G 2203/74; A61G 5/1067; B60N 2/22; A47C 1/024

USPC ...................................................... 297/354.1
See application file for complete search history.

(56) References Cited

U.S. PATENT DOCUMENTS

| 5,556,157 | A  | * | 9/1996  | Wempe ................ A61G 5/006 297/423.26 |
| 7,261,367 | B2 | * | 8/2007  | Duncan ................ A47C 1/0352 297/184.14 |
| 8,641,140 | B2 |   | 2/2014  | Swierczewski |
| 9,376,044 | B2 |   | 6/2016  | Fujita et al. |
| 9,415,705 | B2 |   | 8/2016  | Mixon et al. |
| 9,616,784 | B2 |   | 4/2017  | Nagayasu |
| 9,701,221 | B2 |   | 7/2017  | Nagayasu |
| 2012/0193961 | A1 | * | 8/2012 | Fu ...................... A47C 1/03266 297/316 |
| 2014/0368013 | A1 |   | 12/2014 | Mizuno et al. |
| 2019/0191880 | A1 | * | 6/2019 | Sweeney ............... A61G 7/015 |
| 2019/0193593 | A1 |   | 6/2019 | Watanabe |

* cited by examiner

*Primary Examiner* — Sarah B McPartlin
(74) *Attorney, Agent, or Firm* — Young Basile Hanlon & MacFarlane, P.C.

(57) ABSTRACT

A vehicle seat includes a seat back, a seat base, a base structure that is connected to the seat base, a guide structure, and a primary pivot joint that connects the guide structure to the base structure so that the guide structure is able to rotate with respect to the base structure to change a recline angle of the seat back with respect to the seat base. The vehicle seat also includes a slide structure that is connected to the seat back and has a sliding connection to the guide structure, and a link that connects the seat back to the seat base so that the slide structure slides with respect to the guide structure during rotation of the guide structure with respect to the base structure.

22 Claims, 10 Drawing Sheets

VEHICLE SEAT WITH RECLINING MECHANISM

CROSS-REFERENCE TO RELATED APPLICATIONS

This application claims the benefit of U.S. Provisional Application No. 62/904,261, filed on Sep. 23, 2019, the content of which is hereby incorporated by reference herein for all purposes.

TECHNICAL FIELD

The application relates generally to seats for vehicles.

BACKGROUND

Vehicle seats are often two-part structures that include a seat base and a seat back that extends upward from the seat base. The seat back is often connected to the seat base by a reclining mechanism that allows the seat back to pivot with respect to the seat base.

SUMMARY

One aspect of the disclosure is a vehicle seat includes a seat back, a seat base, a base structure that is connected to the seat base, a guide structure, and a primary pivot joint that connects the guide structure to the base structure so that the guide structure is able to rotate with respect to the base structure to change a recline angle of the seat back with respect to the seat base. The vehicle seat also includes a slide structure that is connected to the seat back and has a sliding connection to the guide structure, and a link that connects the seat back to the seat base so that the slide structure slides with respect to the guide structure during rotation of the guide structure with respect to the base structure.

Another aspect of the disclosure is a vehicle seat that includes a seat back, a seat base, a base structure that is fixed to the seat base, a guide structure, and a primary pivot joint that connects the guide structure to the base structure so that the guide structure is able to rotate with respect to the base structure to change a recline angle of the seat back with respect to the seat base. The vehicle seat also includes a slide structure that is fixed to the seat back and has a sliding connection to the guide structure, an actuator that is connected to the base structure and is operable to cause rotation of the guide structure with respect to the base structure, and a link. The link is pivotally connected to the base structure by a first pivot link joint and is pivotally connected to the slide structure by a second pivot link joint so that the slide structure slides with respect to the guide structure in response to rotation of the guide structure with respect to the base structure.

Another aspect of the disclosure is a vehicle seat that includes a seat back, a seat base, a base structure that is fixed to the seat base, a guide structure, a primary pivot joint that connects the guide structure to the base structure so that the guide structure is able to rotate with respect to the base structure to change a recline angle of the seat back with respect to the seat base, a slide structure that is fixed to the seat back and has a sliding connection to the guide structure, a first actuator that is operable to cause rotation of the guide structure with respect to the base structure, and a second actuator that is operable to cause sliding of the slide structure with respect to the guide structure.

Another aspect of the disclosure is a vehicle seat that includes a seat back, a seat base, a first link that is connected to the seat back and to the seat base, and a second link that is connected to the seat back and to the seat base wherein the first link and the second link cooperate to allow rotation of the seat back with respect to the seat base.

DETAILED DESCRIPTION

Reclining mechanisms in vehicle seats typically allow the seat back to pivot with respect to the seat base around a pivot joint at which a frame member of the seat back is pivotally connected to a frame member of the seat base. The recline angle of the seat back relative to the seat base may be adjusted using the reclining mechanism while a person, referred to herein as a passenger or a seat occupant, is sitting in the seat. During adjustment of the recline angle, the passenger's upper body rotates with respect to their lower body, typically around a point near the passenger's pelvis. Because this point is not aligned with the pivot point around which the seat back rotates, the passenger's back will slide with respect to the seat back.

The description herein relates to vehicle seats that include reclining mechanisms that include pivoting motion and sliding motion of the seat back with respect to the seat base. The vehicle seats that are described herein are configured to reduce the distance by which the passenger's back slides with respect to the seat back during adjustment of the recline angle of the seat back relative to the seat base.

Figure 1:
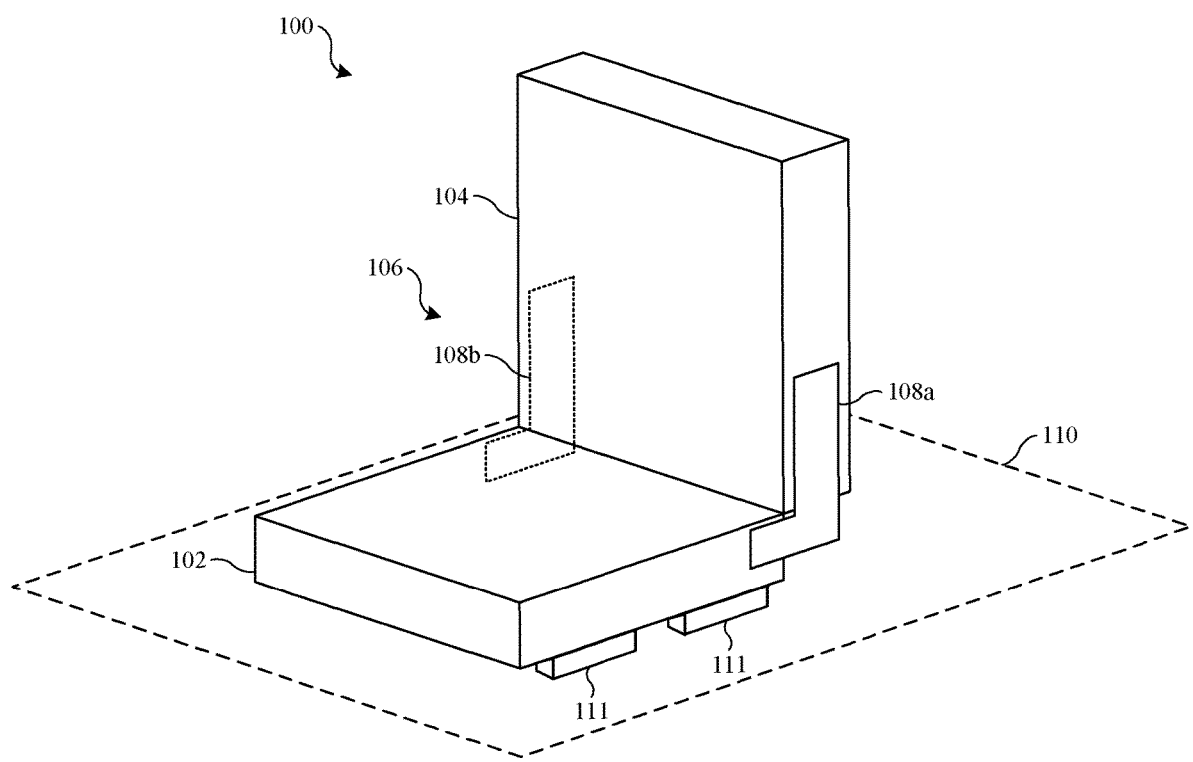
FIG. 1 is a schematic illustration that shows a vehicle seat according to a first implementation that includes a seat base, a seat back, and a reclining mechanism that includes a left joint assembly and a right joint assembly.

FIG. 1 is a schematic illustration that shows a vehicle seat 100. The vehicle seat 100 includes a seat base 102, a seat back 104, and a reclining mechanism 106 that includes a left joint assembly 108a and a right joint assembly 108b. The vehicle seat 100 is supported with respect to a vehicle floor 110 of a vehicle (not shown in FIG. 1) by support structures 111, such as a one or more frame members that connect the seat base 102 to the vehicle floor 110 and may include adjustment mechanisms that allow adjustment of, as examples, a longitudinal (front-to-rear) position of the seat base 102 with respect to the vehicle floor 110 and a pitch angle of the seat base 102 with respect to the vehicle floor 110.

The vehicle seat 100 is intended to be used by a passenger who is travelling in the vehicle. The passenger may sit in the vehicle seat 100 and may adjust portions of the vehicle seat 100 to a comfortable seating position, which will be dependent on the size and proportions of the passenger's body, as well as personal preferences. As an example, the passenger may adjust a recline angle of the vehicle seat 100. With respect to the vehicle seat 100, the recline angle is defined as the angle of the seat back 104 with respect to the seat base 102 relative to an axis that extends laterally in a side-to-side direction relative to the vehicle seat 100).

The vehicle that the vehicle seat 100 is installed in may be a vehicle of any type. As one example, the vehicle that the vehicle seat 100 is installed in may be a road-going passenger vehicle, such as a car, a truck or a bus. As another example, the vehicle that the vehicle seat 100 is installed in may be a train. As another example, the vehicle that the vehicle seat 100 is installed in may be a passenger aircraft.

The seat base 102 is a lower portion of the vehicle seat 100 that is intended to and configured to support the passenger's lower body. The seat base 102 may be of any type and materials. As an example, the seat base 102 may be of a conventional construction that includes a frame, cushions that are supported by the frame, and a cover (e.g., one or more flexible and or rigid cover parts) that extends over the frame and the cushions.

The seat back 104 is an upper portion of the vehicle seat 100 that is intended to and configured to support the passenger's upper body. The seat back 104 may be of any type and materials. As an example, the seat back 104 may be of a conventional construction that includes a frame, cushions that are supported by the frame, and a cover (e.g., one or more flexible and or rigid cover parts) that extends over the frame and the cushions.

The reclining mechanism 106 allows the seat back 104 to be pivoted to the seat base 102 to define various recline angles of the seat back 104 relative to the seat base 102. In the description herein, a recline angle of zero degrees is defined as a fully upright position of the seat back 104 relative to the seat base 102 in which the seat back 104 extends perpendicular to the surface of the seat base 102. Thus, the recline angle of zero degrees is a position in which the seat back 104 is not reclined relative to the seat base 102. In the description herein, a recline angle of 90 degrees corresponds to the seat back 104 extending approximately parallel to the seat base 102.

The reclining mechanism 106 is configured to allow the recline angle to be varied between a minimum recline angle and a maximum recline angle. As an example, the minimum recline angle may be between zero degrees and fifteen. The maximum recline angle may be at least sixty degrees. In an example of an implementation of the reclining mechanism 106, the minimum recline angle may be ten degrees and the maximum recline angle may be eighty degrees.

Although not shown, the reclining mechanism 106 may include a locking structure that moves between a locked position and an unlocked position. In the locked position, the reclining mechanism 106 restrains adjustment of the recline angle and the seat back 104 cannot be pivoted with respect to the seat base. In the unlocked position, the reclining mechanism 106 does not restrain adjustment of the recline angle and the seat back 104 may be pivoted with respect to the seat base 102.

In the illustrated example, the reclining mechanism includes the left joint assembly 108a and the right joint assembly 108b. The left joint assembly 108a and the right joint assembly 108b may be configured similarly (e.g., as mirror images with equivalent components) and any description made herein with respect to one or the left joint assembly 108a or the right joint assembly 108b is applicable to the other.

The left joint assembly 108a is connected to the left side of the seat base 102 and is connected to the left side of the seat back 104. The right joint assembly 108b is connected to the right side of the seat base 102 and is connected to right left side of the seat back 104. As will be explained herein, the left joint assembly 108a and the right joint assembly 108b each include a pivot joint to allow pivoting of the seat back 104 with respect to the seat base 102. By allowing pivoting of the seat back 104 with respect to the seat base 102, the left joint assembly 108a and the right joint assembly 108b cause the recline angle of the vehicle seat 100 to change and therefore allow the recline angle of the vehicle seat 100 to be adjusted between the minimum recline angle and the maximum recline angle.

Figure 2:
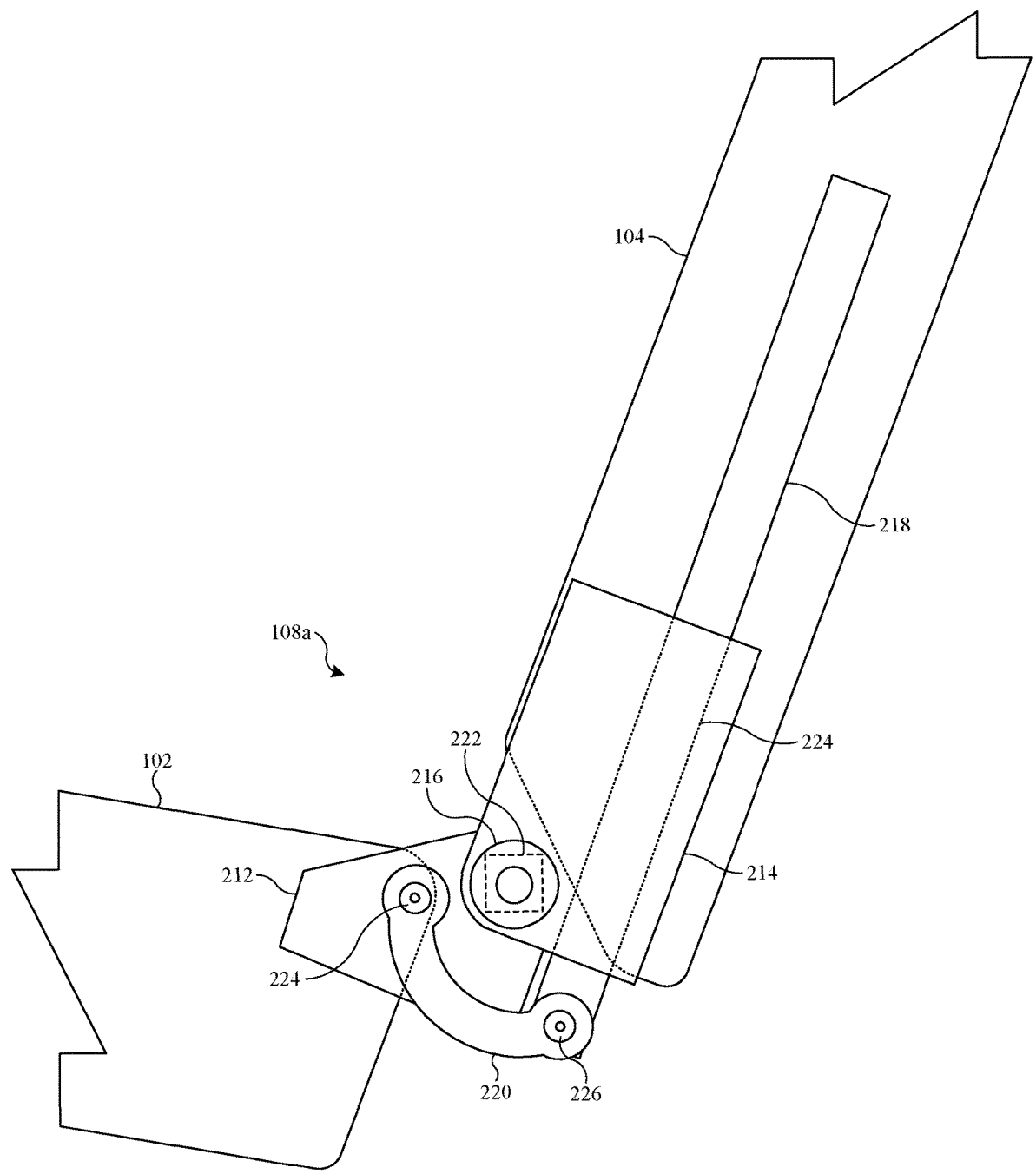
FIG. 2 is a side view illustration of the left joint assembly of the reclining mechanism of the vehicle seat.

FIG. 2 is a side view illustration the left joint assembly 108a of the reclining mechanism 106 of the vehicle seat 100. The right joint assembly 108b is equivalent to the left joint assembly 108a and may be implemented using the same structural configuration and so that it functions in the same manner as the left joint assembly 108a, as will be described herein.

The left joint assembly 108a includes a base structure 212, a guide structure 214, a primary pivot joint 216, a slide structure 218, a link 220, and an actuator 222.

The base structure 212 is connected to the seat base 102. The base structure 212 may be connected to the seat base in a fixed positional relationship so that the base structure 212 is not able to move with respect to the seat base 102, as in the illustrated example. The base structure 212 may be a bracket, a portion of the seat frame of the seat base 102, or any other rigid structure that is connected to the seat base 102 and is connectable to other components of the left joint assembly 108a as will be described.

The guide structure 214 is a rigid structure that is connected to the base structure 212 and is connected to the slide structure 218. The guide structure 214 is an intermediate component between the seat base 102 and the seat back 104 that, along with other components, defines a pivoting and sliding relationship of the seat back 104 relative to the seat base 102. The guide structure 214 has a pivoting connection with respect to the seat base 102 and the base structure 212. The guide structure 214 is connected to seat back 104 by the slide structure 218 so that the slide structure 218 and the seat back 104 pivot with the guide structure 214. At the same time, the guide structure has a sliding connection to the slide structure and the seat back 104 that allows the seat back 104 to slide with respect to the guide structure 214 during pivoting of the seat back 104 with respect to the seat base 102.

The guide structure 214 is connected to the base structure 212 by a primary pivot joint 216. The primary pivot joint 216 is oriented to allow rotation of the guide structure 214 with respect to the base structure 212. Rotation of the guide structure 214 with respect to the base structure 212 occurs with respect to an axis that is defined by the primary pivot joint 216 and extends laterally in a side-to-side direction with respect to the vehicle seat 100. The rotation axis that is defined by the primary pivot joint 216 is further defined by the equivalent pivot joint of the right joint assembly 108b, and thus the axis may extend through the pivot joints of the left joint assembly 108a and the right joint assembly 108b.

The slide structure 218 is connected to the seat back 104 in a fixed manner. Because of the fixed connection of the slide structure 218 to the seat back 104, the slide structure 218 and the seat back 104 slide in unison with respect to the guide structure 214, and the slide structure 218, the seat back 104, and the guide structure 214 pivot in unison with respect to the base structure 212 and the seat base 102.

The link 220 of the left joint assembly 108a is connected to the seat back 104 and is connected to the seat base 102 in order to cause sliding motion of the seat back 104 with respect to the guide structure 214 in response to pivoting of the seat back 104 with respect to the seat base 102. In the illustrated example, the link 220 is a rigid member that is connected to a lower end of the slide structure 218 by a first pivot link joint 224 and is connected to the base structure 212 by a second pivot link joint 226. During rotation of the seat back 104 relative to the seat base 102, the link 220 constrains motion of the seat back 104, which causes sliding of the seat back 104 at the sliding joint between the slide structure 218 (which is fixed to the seat back 104) and the guide structure 214 (which is pivotally connected to the seat base 102 by the primary pivot joint 216 and the base structure 212).

The actuator 222 is configured to cause pivoting motion of the seat back 104 with respect to the seat base 102. The actuator 222 may be connected to the primary pivot joint 216 in order to cause pivoting motion of the seat back 104 with respect to the seat base 102. As an example, the actuator 222 may be a rotational actuator that includes a rotary electric motor and associated components (e.g., a gear box and/or a position encoder), with the rotary electric motor having a housing that is fixedly connected to one of the base structure 212 or the guide structure 214 and a rotational output shaft that is connected to the other of the base structure 212 and the guide structure 214 through the primary pivot joint 216 or through another operative connection to cause the guide structure 214 to rotate with respect to the base structure.

It should be understood that the actuator 222 is an example of actuation that is operable to cause movement of the seat back 104 of the vehicle seat 100 with respect to the seat base 102 of the vehicle seat 100 in order to change the recline angle. Other types of actuators may be used as the actuator 222 and/or the location and mode of operation of the actuator 222 may be changed.

Figure 3:
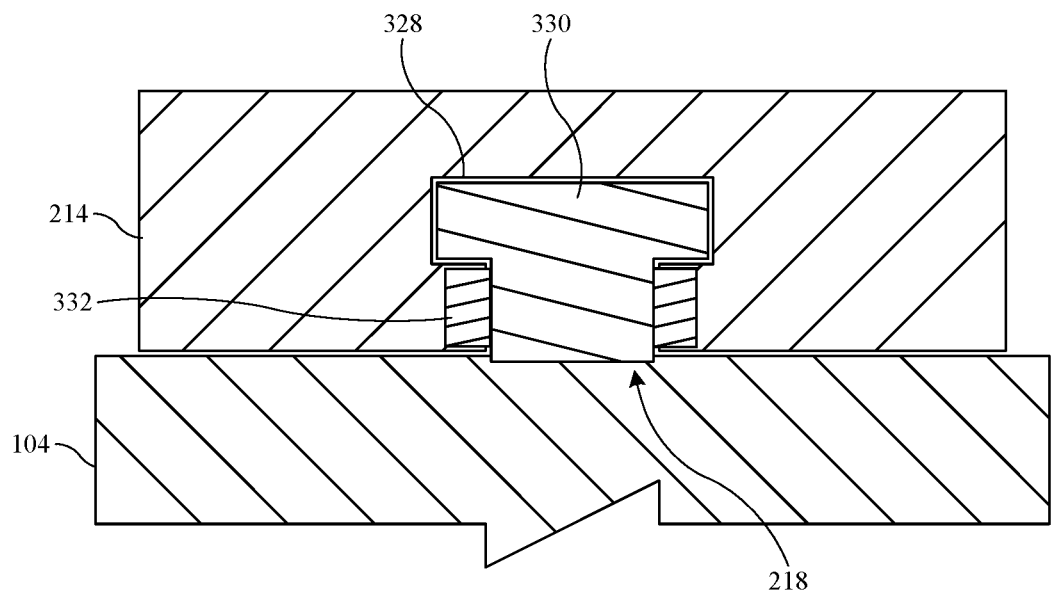
FIG. 3 is a cross-section illustration showing connection of a guide structure of the reclining mechanism to a slide structure of the reclining mechanism and to the seat back of the vehicle seat.

FIG. 3 is a cross-section illustration showing connection of the guide structure 214 to the slide structure 218 and the seat back 104. In the illustrated example, the guide structure 214 includes a slot 328 and the slide structure 218 includes a rail 330. The rail 330 is disposed in the slot 328 that is formed in the guide structure 214. The guide structure 214 also includes bearings 332 (e.g., roller bearings) that are engageable with the rail 330 to allow for smooth movement of the rail 330 with respect to the slot 328. The slot 328 of the guide structure 214 is elongate and extends generally in the same direction as the rail 330 of the slide structure 218. The slot 328 of the guide structure 214 has a cross-section that is complementary to the cross-section of the rail 330 of the slide structure 218. In the illustrated example, the slot 328 of the guide structure 214 and the rail 330 of the slide structure 218 have complementary T-shaped cross-sections.

Figure 4:
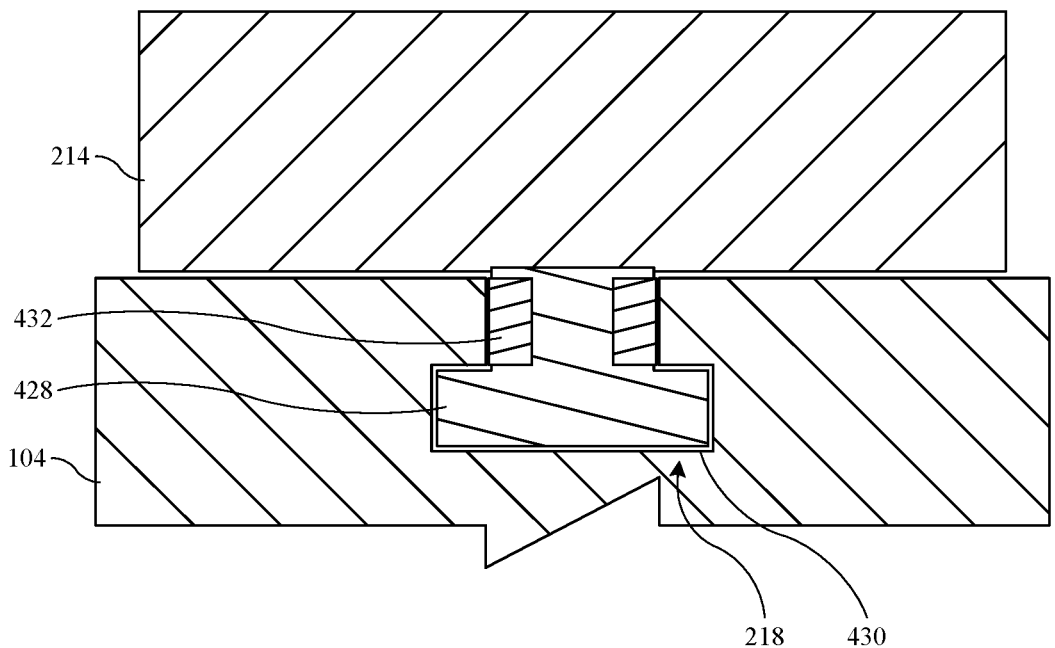
FIG. 4 is a cross-section illustration showing connection of a guide structure of the reclining mechanism to a slide structure of the reclining mechanism and to the seat back of the vehicle seat according to an alternative implementation.

FIG. 4 is a cross-section illustration showing connection of the guide structure 214 to the slide structure 218 and the seat back 104 according to an alternative implementation. In the illustrated example, the guide structure 214 includes a rail 428 and the slide structure 218 includes a slot 430. The rail 428 of the guide structure 214 is disposed in the slot 430 of the slide structure 218, which is formed in the seat back 104 or in a separate component. The guide structure 214 also includes bearings 432 (e.g., roller bearings) that are engageable with the slot 430 to allow for smooth movement of the rail 428 with respect to the slot 430. The rail 428 of the guide structure 214 is elongate and extends generally in the same direction as the slot 430 of the slide structure 218. The rail 428 of the guide structure 214 has a cross-section that is complementary to the cross-section of the slot 430 of the slide structure 218. In the illustrated example, the rail 428 of the guide structure 214 and the slot 430 of the slide structure 218 have complementary T-shaped cross-sections.

Figure 5:
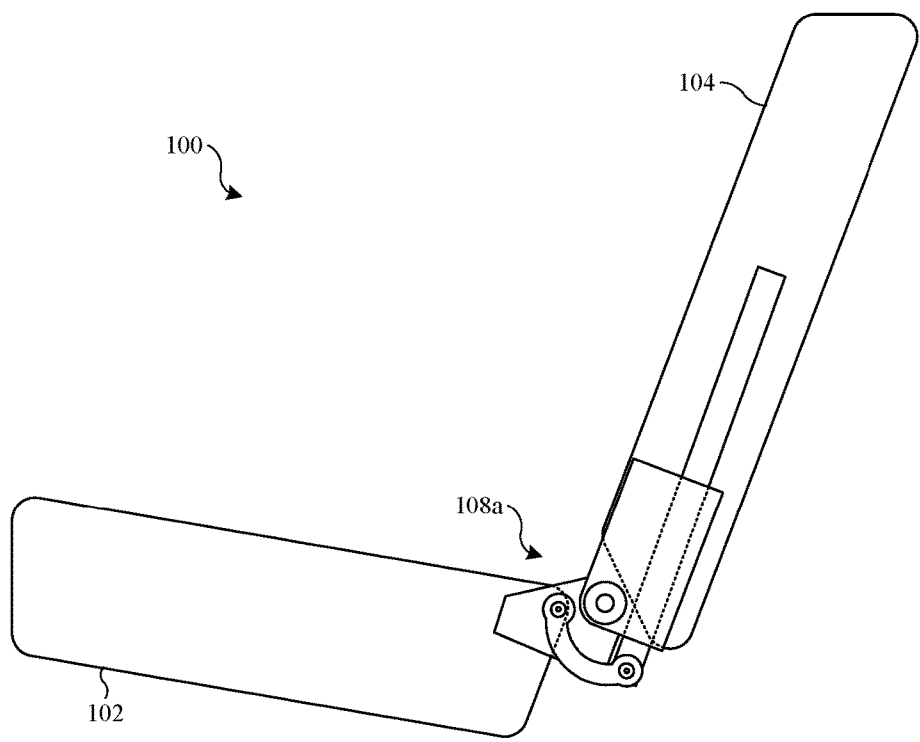
FIG. 5 is a side view illustration that shows the vehicle seat in an upright position.
Figure 6:
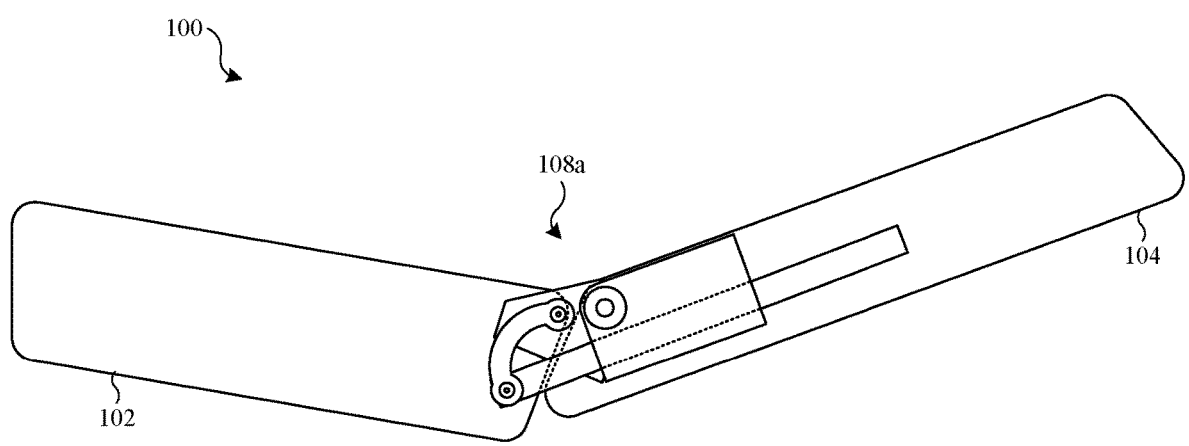
FIG. 6 is a side view illustration that shows the vehicle seat in a reclined position.

FIG. 5 is a side view illustration that shows the vehicle seat 100 in an upright position. FIG. 6 is a side view illustration that shows the vehicle seat 100 in a reclined position. In the illustrated example of the upright position (FIG. 5) of the vehicle seat 100 and in the illustrated example of the reclined position (FIG. 6) of the vehicle seat 100, the seat base 102 has an inclination angle or approximately ten degrees relative to horizontal. In the illustrated example of the upright position (FIG. 5) of the vehicle seat 100, the seat back 104 has a recline angle of approximately ten degrees relative to the seat base 102. In the illustrated example of the reclined position (FIG. 6) of the vehicle seat 100, the seat back 104 has a recline angle of approximately sixty degrees relative to the seat base 102.

The actuator 222 can be activated to change the recline angle of the seat back 104 with respect to the seat base 102. In this example, the actuator 222 is fixed with respect to the base structure 212 and is connected to the primary pivot joint 216 so that the actuator is able to cause rotation of the guide structure 214.

As the guide structure 214 rotates toward the maximum recline angle (i.e., as the recline angle increases) in response to rotational force applied by the actuator 222, the guide structure 214 pivots in a clockwise direction. The connection of the guide structure 214 to the slide structure 218 causes the slide structure 218 and the seat back to rotate with the guide structure 214 as the guide structure 214 pivots in the clockwise direction. As the guide structure 214 rotates toward the maximum recline position, the guide structure 214 constrains the rotational angle of the slide structure 218. Since the slide structure 218 is fixed to the seat back 104, the seat back 104 also rotates with the guide structure 214. At the same time, the guide structure 214 allows sliding of the slide structure 218. Because the link 220 connects the slide structure 218 (directly or through the seat back 104) to the base structure 212 (directly or through the seat base 102) motion of the slide structure 218 is constrained in a manner that induces sliding of the slide structure 218 and the seat back 104 downward relative to the guide structure 214. The link 220 does not constrain rotation of the guide structure 214 with respect to the base structure 212 between the minimum recline angle and the maximum recline angle because of the pivotal connections of the link 220 to the base structure 212 at the first pivot link joint 224 and to the slide structure 218 at the second pivot link joint 226.

As the guide structure 214 rotates toward the minimum recline angle (i.e., as the recline angle increases) in response to rotational force applied by the actuator 222, the guide structure 214 pivots in a counterclockwise direction. The connection of the guide structure 214 to the slide structure 218 causes the slide structure 218 and the seat back to rotate with the guide structure 214 as the guide structure 214 pivots in the counterclockwise direction. As the guide structure 214 rotates from the upright position to the reclined position, the guide structure 214 constrains the rotational angle of the slide structure 218. Since the slide structure 218 is fixed to the seat back 104, the seat back 104 also rotates with the guide structure 214. At the same time, the guide structure 214 allows sliding of the slide structure 218. Because the link 220 connects the slide structure 218 (directly or through the seat back 104) to the base structure 212 (directly or through the seat base 102) motion of the slide structure 218 is constrained in a manner that induces sliding of the slide structure 218 and the seat back 104 upward relative to the guide structure 214. The link 220 does not constrain rotation of the guide structure 214 with respect to the base structure 212 between the minimum recline angle and the maximum recline angle because of the pivotal connections of the link 220 to the base structure 212 at the first pivot link joint 224 and to the slide structure 218 at the second pivot link joint 226.

Figure 7:
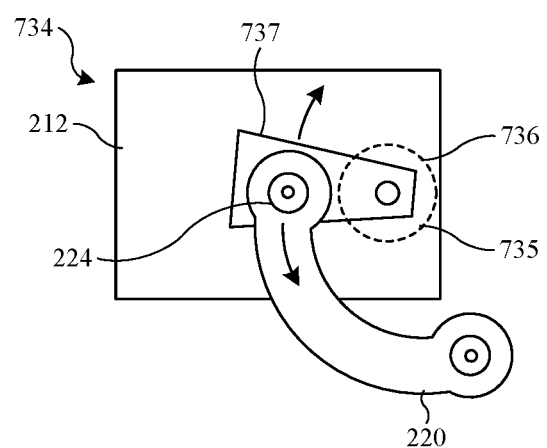
FIG. 7 is a side view illustration that shows a slide adjuster that is operable to change the amount of sliding that occurs during rotation of the seat back relative to the seat base.

FIG. 7 is a side view illustration that shows a slide adjuster 734 that is operable to change the amount of sliding that occurs during rotation of the seat back 104 relative to the seat base 102. The slide adjuster 734 is connected to the base structure 212 and is operable to change the location of the first pivot link joint 224 with respect to the base structure 212. Since the first pivot link joint 224 connects the link 220 to the base structure 212, moving the location of the first pivot link joint 224 changes the amount of sliding that occurs in response to rotation. In the illustrated example, the slide adjuster includes an adjustment motor 735 having an output shaft 736 that rotates a crank 737. The first pivot link joint 224 is connected to the crank 737 and is eccentrically mounted with respect to the output shaft 736. Thus, when the adjustment motor 735 rotates the output shaft 736, the position of the first pivot link joint 224 changes (e.g., at least between a first position and a second position or continuously between a first end limit and a second end limit).

Figure 8:
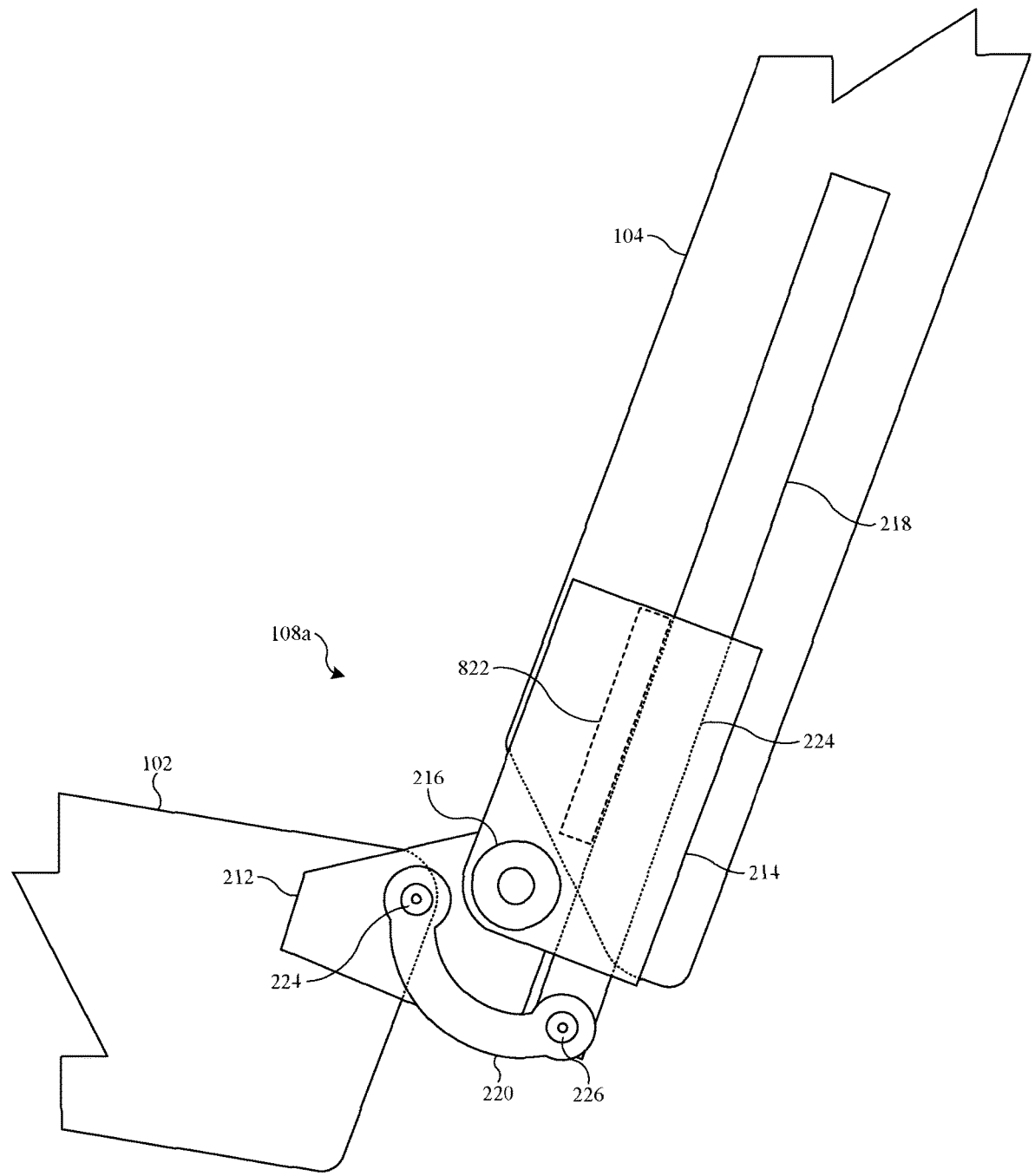
FIG. 8 is a side view illustration that shows the vehicle seat with an actuator according to a first alternative actuation implementation.

FIG. 8 is a side view illustration that shows the vehicle seat 100 with an actuator 822 according to a first alternative actuation implementation. The vehicle seat 100 is consistent with the previous description except as stated herein, and like-numbered parts are implemented in accordance with the previous description. The actuator 222 of the vehicle seat 100 is omitted in lieu of the actuator 822. The actuator 822 is connected to the guide structure 214 and is operable to cause sliding of the slide structure 218 with respect to the guide structure 214. Sliding of the slide structure 218 with respect to the guide structure 214 drives rotation of the guide structure 214 with respect to the base structure 212 through the link 220. As one example, the actuator 822 may be a linear actuator that includes a linear electric motor that causes sliding motion of the slide structure 218 with respect to the guide structure 214 by interaction of electromagnets located in the guide structure 214 with magnets located in the slide structure 218. As another example, the actuator 822 may be a rotational electric motor that is fixed to the guide structure 214 and is operable to drive sliding of the slide structure 218 with respect to the guide structure 214, such as by a gear wheel connected to the electric rotational motor and a gear track that is connected to the slide structure 218.

Figure 9:
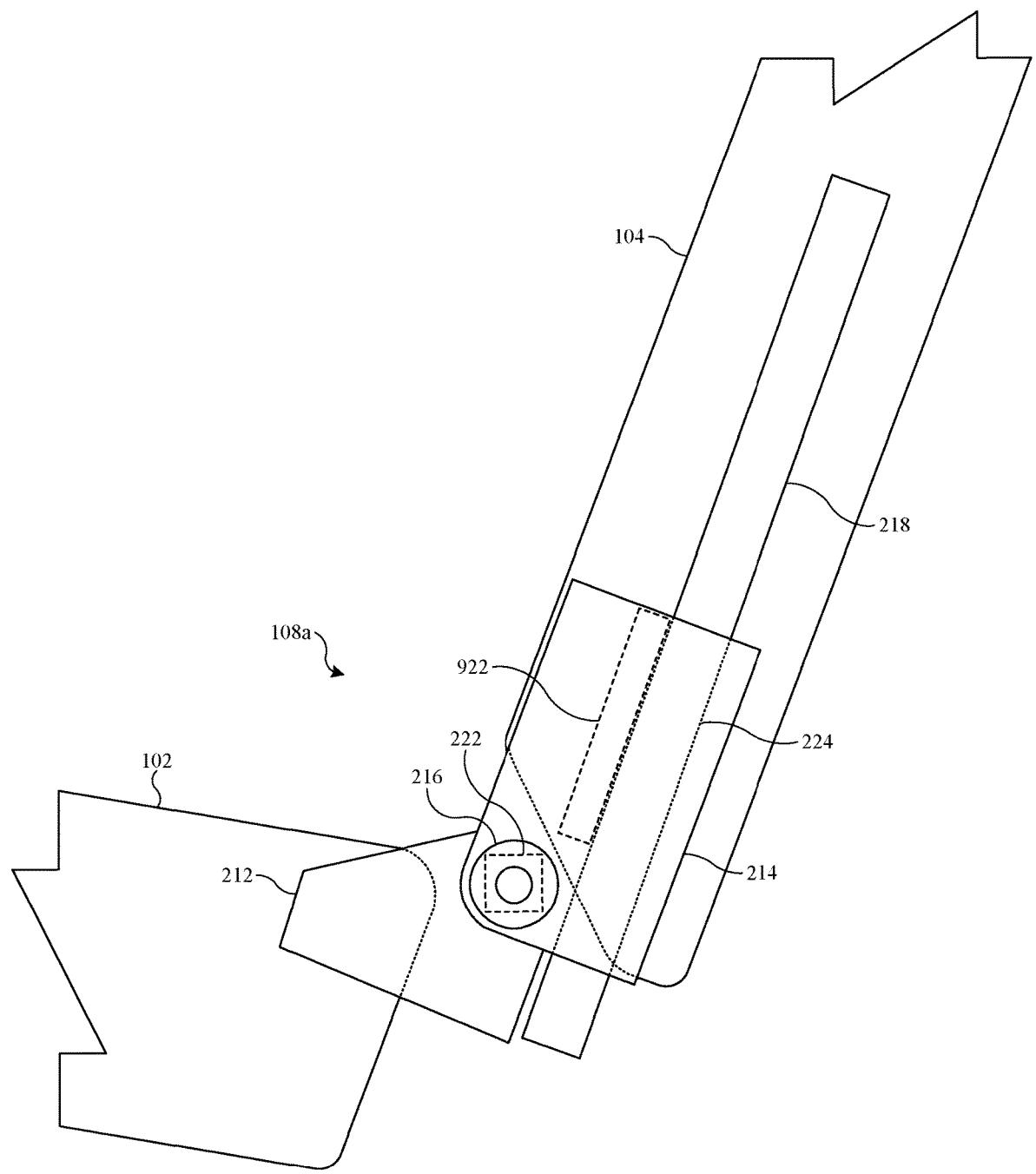
FIG. 9 is a side view illustration that shows the vehicle seat with an actuator according to a second alternative actuation implementation.

FIG. 9 is a side view illustration that shows the vehicle seat 100 with an actuator 922 according to a second alternative actuation implementation. The vehicle seat 100 is consistent with the previous description except as stated herein, and like-numbered parts are implemented in accordance with the previous description. The link 220 of the vehicle seat 100 is omitted. The actuator 922 is connected to the guide structure 214 and is operable to cause sliding of the slide structure 218 with respect to the guide structure 214 in the manner described with respect to the actuator 822. The actuator 222 causes rotation of the guide structure 214 with respect to the base structure 212. The actuator 922 and the actuator 222 are independently controlled. Sliding and rotation are not dependent on one another due to the omission of the link 220.

Figure 10:
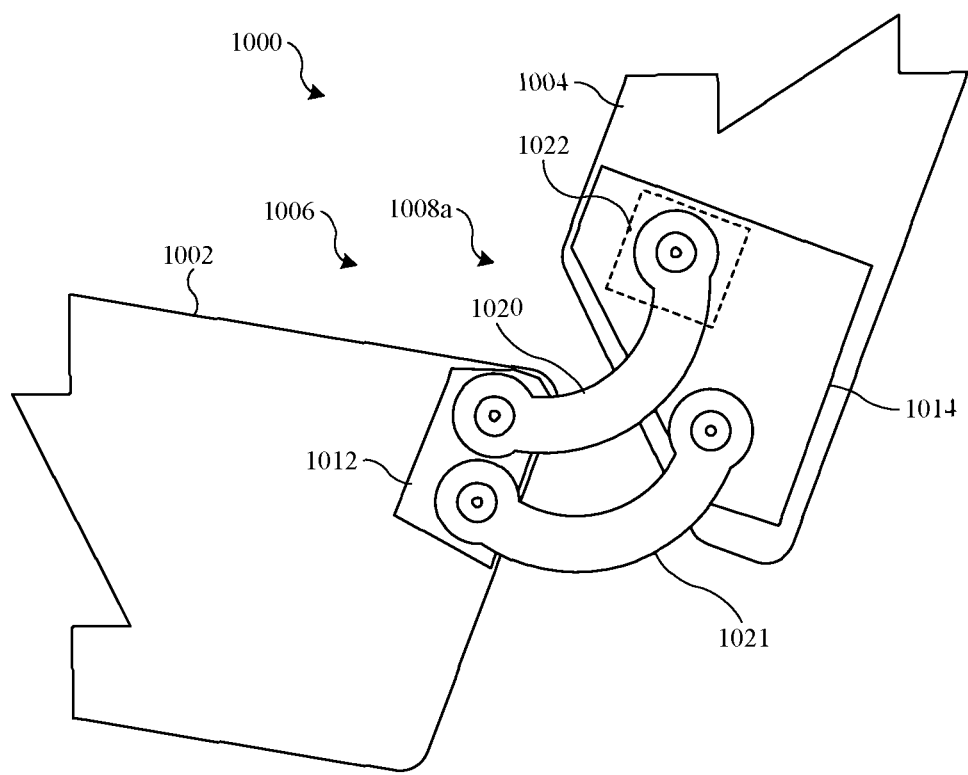
FIG. 10 is a side view illustration of a vehicle seat according to a second implementation that includes a left joint assembly of a reclining mechanism of the vehicle seat in an upright position.
Figure 11:
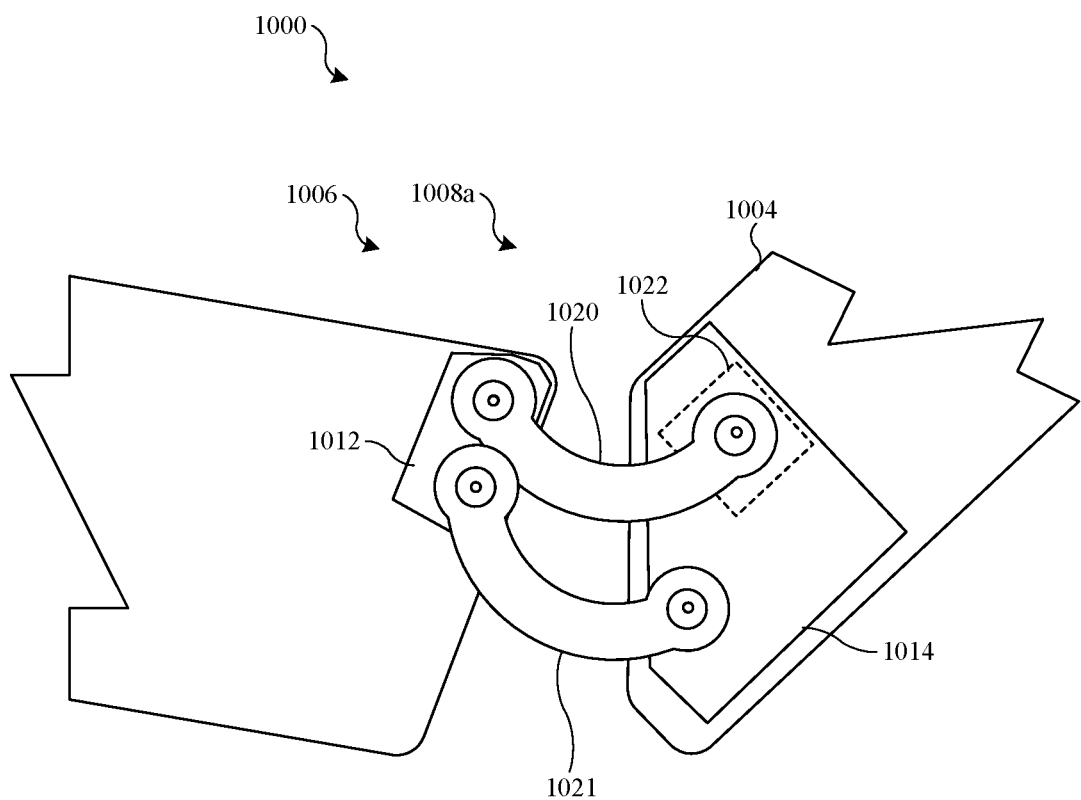
FIG. 11 is a side view illustration of a vehicle seat according to a second implementation that includes a left joint assembly of a reclining mechanism of the vehicle seat in a reclined position.

FIG. 10 is a side view illustration of a left joint assembly 1008*a* of a reclining mechanism 1006 of a vehicle seat 1000 in an upright position. FIG. 11 is a side view illustration of a left joint assembly 1008*a* of a reclining mechanism 1006 of a vehicle seat 1000 in a reclined position. The right joint assembly (not shown) is equivalent to the left joint assembly 1008*a* and may be implemented using the same structural configuration and so that it functions in the same manner as the left joint assembly 1008*a*, as will be described herein.

The vehicle seat 1000 includes a seat base 1002 and a seat back 1004, which are implemented in the manner described with respect to the seat base 102 and the seat back 104.

The left joint assembly 1008*a* includes a base structure 1012, which is similar to the base structure 212 of the vehicle seat 100. The left joint assembly 1008*a* also includes a back structure 1014, which is a structure that is fixed to the seat back 1004. The left joint assembly 1008*a* also includes an actuator 1022, which in this example is fixed to the back structure 1014. The base structure 1012 is connected to the back structure 1014 by a first link 1020 and a second link 1021. The first link 1020 is pivotally connected to the base structure 1012 and to the back structure 1014. The second link 1021 is pivotally connected to the base structure 1012 and to the back structure 1014. The pivotal connections of the first link 1020 and the second link 1021 to the base structure 1012 and the back structure 1014 may be implemented in the manner described with respect to the first pivot link joint 224 and the second pivot link joint 226 of the vehicle seat 100. The actuator 1022 may be connected to the back structure 1014 so that it is able to drive rotation of one of the first link 1020 or the second link 1021. The first link 1020 and the second link 1021 define a four bar linkage. When the first link 1020 or the second link 1021 are rotated, the back structure 1014 moves along an arc-shaped path with respect to the base structure 1012 to adjust the recline angle of the back structure 1014 and the seat back 1004 with respect to the base structure 1012 and the seat base 1002 (FIG. 11). Thus, the first link 1020 is connected to the seat back 1004 and to the seat base 1002, the second link 1021 is connected to the seat back 1004 and to the seat base 1002, and the first link 1020 and the second link 1021 cooperate to allow rotation of the seat back 1004 with respect to the seat base 1002.

Figure 12:
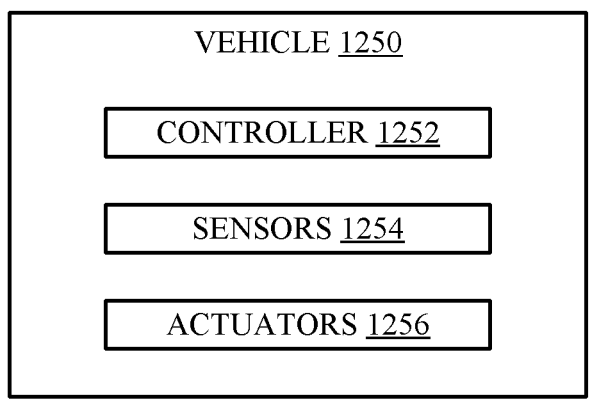
FIG. 12 is a block diagram of a vehicle.

FIG. 12 is a block diagram that shows a vehicle 1250 that the vehicle seat 100 may be included in. In addition to the vehicle seat 100, the vehicle 1250 may include a controller 1252, sensors 1254, and actuators 1256. Other components may be included in the vehicle 1250.

The controller 1252 may be a conventional computing device (e.g., having components such as a processor and a memory) that is provided with computer program instructions that allow the controller 1252 to generate commands that regulate operation of the vehicle 1250. As an example, the controller 1252 may generate commands to regulate operation of components of the vehicle seat 100.

The commands generated by the controller 1252 may be generated using sensor signals that are generated by the sensors 1254 and are provided to the controller 1252 as inputs. The sensors 1254 may include, as examples, one or more accelerometers that measure motion of the vehicle 1250 and/or various parts of the vehicle 1250, one or more cameras that monitor conditions around the vehicle 1250, and/or one or more three-dimensional sensors (e.g., LIDAR, structured light, etc.) that monitor conditions around the vehicle 1250.

The actuators 1256 are conventional. As examples, the actuators 1256 may include a propulsion system, a braking system, a suspension system, and a steering system.

The vehicle 1250 may be configured as a conventional road-going vehicle. As examples, the vehicle 1250 may be configured as a passenger car, a utility vehicle, a sport utility vehicle, a truck, a bus, or a trailer.

As described above, one aspect of the present technology controlling operation of a vehicle seat, which may include automatic adjustment based on an identity of a passenger. Systems that implement automatic adjustment of the vehicle seat based on the identity of the passenger may gather and use data that is available from various sources to adjust the vehicle seat based on the preferences of the passenger. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information. As one example, information describing a passenger may be collected and stored in a profile that can be accessed and used to determine seat settings according to a determination of the identity of the person that is sitting in the vehicle seat. As another example, the vehicle may include sensors that are used to control operation of the seat adjustment system, and these sensors may obtain information (e.g., still pictures or video images) that can be used to identify persons that are present in the vehicle or near the vehicle.

The present disclosure recognizes that the use of such personal information data, in the present technology, can be used to the benefit of users. For example, the personal information data can be used to develop a user profile that describes seating adjustment preferences under various conditions and at different times of day.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide personal data for use in seat adjustment. In yet another example, users can select to limit the length of time personal data is maintained or entirely prohibit the use and storage of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A vehicle seat, comprising:
   a seat back;
   a seat base;
   a base structure that is fixed to the seat base;
   a guide structure;
   a primary pivot joint that is directly connected to the base structure and is directly connected to the guide structure to connect the guide structure to the base structure so that the guide structure is able to rotate with respect to the base structure to change a recline angle of the seat back with respect to the seat base;
   a slide structure that is connected to the seat back and has a sliding connection to the guide structure; and
   a link that connects the seat back to the seat base so that the slide structure slides with respect to the guide structure during rotation of the guide structure with respect to the base structure.

2. The vehicle seat of claim 1, wherein the base structure is fixed to the seat base.

3. The vehicle seat of claim 1, wherein the slide structure is fixed to the seat back.

4. The vehicle seat of claim 1, further comprising:
   an electric actuator that is operable to change the recline angle of the seat back with respect to the seat base.

5. The vehicle seat of claim 4, wherein the electric actuator is a rotational electric actuator that is able to cause rotation of the guide structure with respect to the base structure.

6. The vehicle seat of claim 4, wherein the actuator is a linear electric actuator that is able to cause sliding of the slide structure with respect to the guide structure.

7. The vehicle seat of claim 1, wherein the link is pivotally connected to the seat base and the link is pivotally connected to the seat back.

8. The vehicle seat of claim 7, wherein the pivotal connection of the link to the seat base includes a first pivot link joint that directly connects the link to the base structure and the pivotal connection of the link to the seat back includes a second pivot link joint that directly connects the link to the slide structure.

9. The vehicle seat of claim 8, further comprising:
   a slide adjuster, wherein the pivotal connection of the link to the seat base includes a first pivot link joint that is directly connected to the slide adjuster and is connected to the base structure by the slide adjuster so that the slide adjuster is operable to change a position of the first pivot link joint with respect to the base structure, and the pivotal connection of the link to the seat back includes a second pivot link joint that directly connects the link to the slide structure.

10. The vehicle seat of claim 1, wherein the guide structure includes a slot and the slide structure includes a rail that is disposed in the slot.

11. The vehicle seat of claim 1, wherein the slide structure includes a slot and the guide structure includes a rail that is disposed in the slot.

12. A vehicle seat, comprising:
    a seat back;
    a seat base;
    a base structure that is fixed to the seat base;
    a guide structure;
    a primary pivot joint that connects the guide structure to the base structure so that the guide structure is able to rotate with respect to the base structure to change a recline angle of the seat back with respect to the seat base;
    a slide structure that is fixed to the seat back and has a sliding connection to the guide structure;
    an actuator that is connected to the base structure and is operable to cause rotation of the guide structure with respect to the base structure; and
    a link that is pivotally connected to the base structure by a first pivot link joint at a first location that is fixed with respect to the base structure and the link and is pivotally connected to the slide structure by a second pivot link joint at a second location that is fixed with respect to the slide structure and the link so that the slide structure slides with respect to the guide structure in response to rotation of the guide structure with respect to the base structure.

13. The vehicle seat of claim 12, further comprising:
    a slide adjuster that is operable to change a position of the first pivot link joint with respect to the base structure.

14. The vehicle seat of claim 12, wherein the guide structure includes a slot and the slide structure includes a rail that is disposed in the slot.

15. The vehicle seat of claim 12, wherein the slide structure includes a slot and the guide structure includes a rail that is disposed in the slot.

16. A vehicle seat, comprising:
    a seat back;
    a seat base;
    a base structure that is fixed to the seat base;
    a guide structure;
    a primary pivot joint that connects the guide structure to the base structure so that the guide structure is able to rotate with respect to the base structure to change a recline angle of the seat back with respect to the seat base;
    a slide structure that is fixed to the seat back and has a sliding connection to the guide structure;
    a first electric actuator that is operable to cause rotation of the guide structure with respect to the base structure; and
    a second electric actuator that is operable to cause sliding of the slide structure with respect to the guide structure.

17. The vehicle seat of claim 16, wherein the first electric actuator is a rotational electric actuator and the second electric actuator is a linear electric actuator.

18. The vehicle seat of claim 16, wherein the guide structure includes a slot and the slide structure includes a rail that is disposed in the slot.

19. The vehicle seat of claim 16, wherein the slide structure includes a slot and the guide structure includes a rail that is disposed in the slot.

20. The vehicle seat of claim 16, wherein the first electric actuator is fixed to the base structure and the second electric actuator is fixed to the guide structure.

21. The vehicle seat of claim 16, wherein the second electric actuator is a rotational electric actuator that is fixed to the guide structure.

22. The vehicle seat of claim 16, wherein the first electric actuator and the second electric actuator are independently controlled.

* * * * *